United States Patent

Gadre et al.

Patent Number: 5,995,161
Date of Patent: Nov. 30, 1999

[54] DIGITAL VIDEO PROCESSOR WITH SUBVIDEO PROCESSOR

[75] Inventors: Shirish C. Gadre, San Jose; Cem I. Duruoz, San Francisco; Taner Ozcelik, Fremont, all of Calif.

[73] Assignees: Sony Corporation, Tokyo, Japan; Sony Electronics Inc., Park Ridge, N.J.

[21] Appl. No.: 08/832,378

[22] Filed: Apr. 2, 1997

[51] Int. Cl.[6] .................................................. H04N 5/14
[52] U.S. Cl. ........................ 348/564; 345/113; 348/566; 348/569
[58] Field of Search .................................. 348/563–567, 348/584, 588, 569; 345/113

[56] References Cited

U.S. PATENT DOCUMENTS

| | | | |
|---|---|---|---|
| 4,746,983 | 5/1988 | Hakemada | 348/565 |
| 5,675,397 | 10/1997 | Yamaguchi et al. | 348/565 |
| 5,699,077 | 12/1997 | Hosotani | 345/113 |
| 5,801,785 | 9/1998 | Crump et al. | 348/567 |

Primary Examiner—Victor R. Kostak
Attorney, Agent, or Firm—Wood, Herron & Evans, L.L.P.

[57] ABSTRACT

An improved architecture for a digital video processor that processes subvideo data to be superimposed on a main video image during a display image scanning process. The improved digital video processor divides and partitions the execution of subvideo data between a programable CPU and a dedicated hardware processor. The CPU is used to process the simpler, less time critical, nonpixel data, and the more complex, more time critical pixel data is processed in real time using a dedicated hardware processor operating under the control of the CPU. The improved digital video processor is adaptable to process subvideo data being supplied in different data formats.

14 Claims, 4 Drawing Sheets

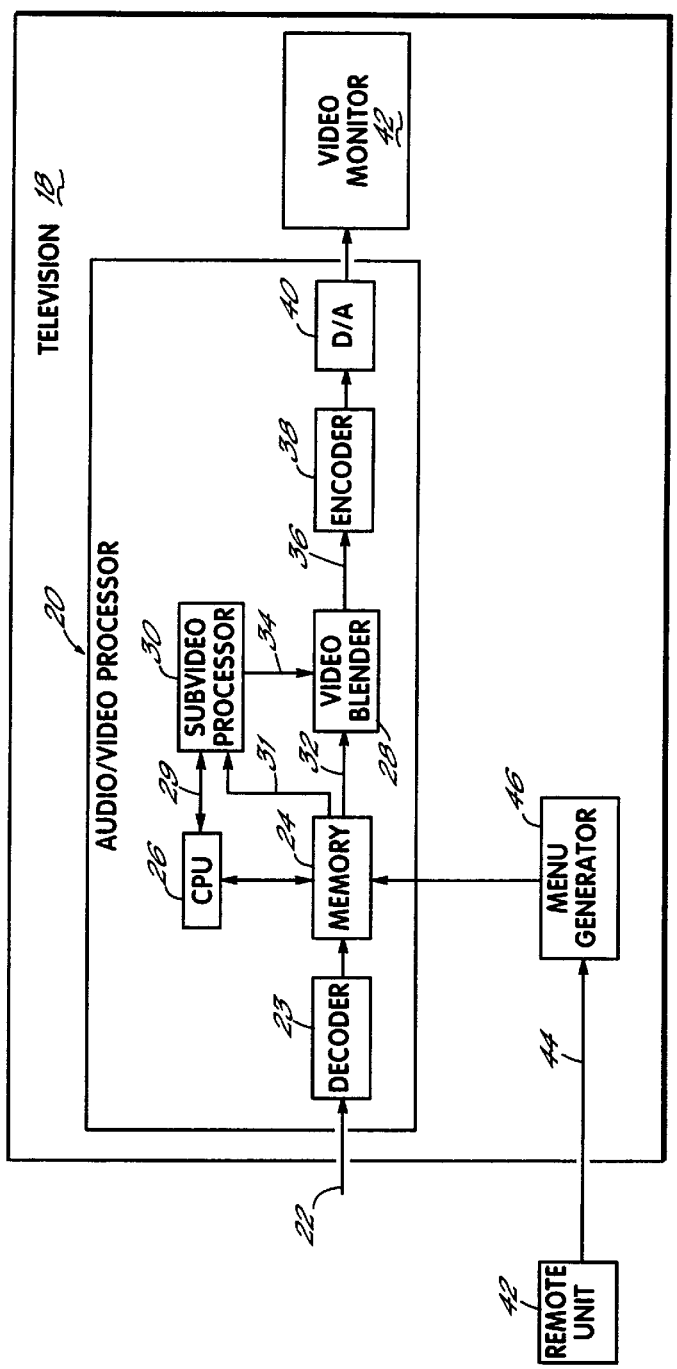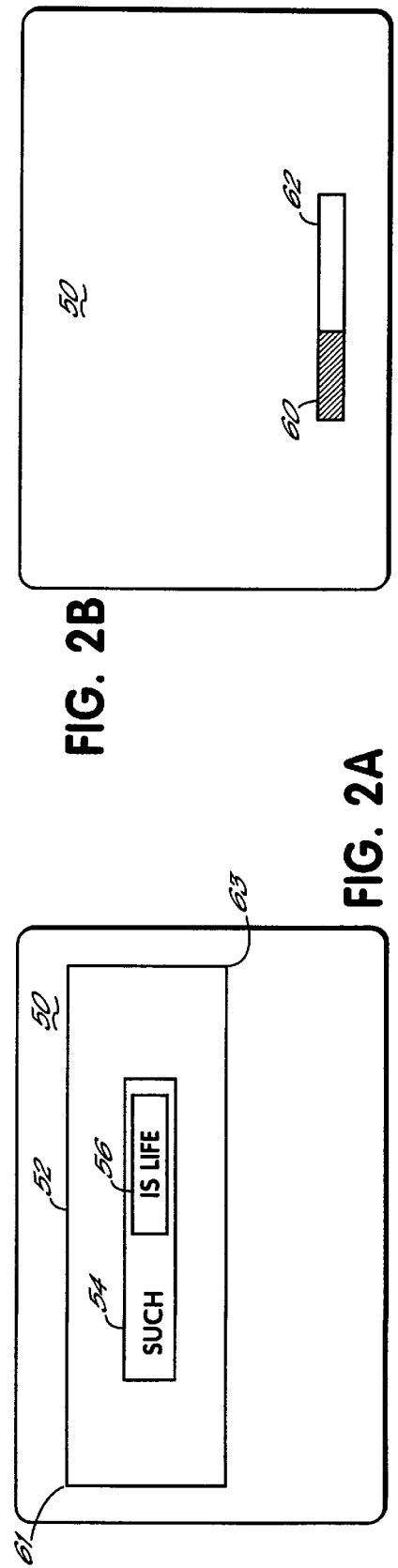

DIGITAL VIDEO PROCESSOR WITH SUBVIDEO PROCESSOR

FIELD OF THE INVENTION

This invention relates to the digital processing of video to be displayed on a television screen and more particularly, to digitally superimposing a display of a second, subvideo image onto a first, main video image.

BACKGROUND OF THE INVENTION

There are many circumstances in which a television screen display is required to superimpose one video image on top of another video image. In the past, such superimposed images were generally created at the source of the video signal as part of the programming. Today, there are more and more applications where it is desirable to be able to create superimposed video images both from the program source, and interactively based on a user input. Almost all televisions manufactured today are capable of interfacing with different sources of programmed materials providing a video input signal for display on the television screen, for example, a VCR, a digital versatile or video disk ("DVD") player, cable, DSS, etc. Further, some of those sources provide digital audio and video input signals in accordance with the Moving Picture Expert Group MPEG-2 audio/video digital compression standard. Thus, contemporary televisions preferably have the capability of processing digital input signals and providing digital signals representing the desired images. Most often, those digital signals are converted to analog signals for use by known analog television display units.

Further, most televisions manufactured today and/or their plug compatible program sources have user interactive capabilities that utilize menus of possible actions superimposed on the screen simultaneously with the display of program material. Using such superimposed menu displays, a user may choose to have captions or subtitles displayed on the screen. In other applications, the displayed menus may be used to provide desired adjustments or settings, for example, audio and video levels, game time, degree of difficulty, etc., which are unique to the user. Those settings are often displayed in the form of linear scales that change in response to a user input pushing a button.

When program sources provide information in digital form, the information is provided in a data packet. Preferably, the audio and main video data are provided in respective data packets in an "MPEG-2" format. However, the information relating to subvideo or superimposed video may be provided in a data packet in any one of several formats. For example, the superimposed video may be provided in a Subpicture format that is defined in the known Digital Video Display ("DVD") standard. The Subpicture format includes a header block, a pixel data block, and a command data block. Generally, the header is used to identify the general nature of the data. For example, the header may be used to identify the format of the data, whether the pixel data is compressed, if a command structure is used, how the data is to be read, etc. In the Subpicture format, the pixel data represents color and contrast information and is compressed using known compression techniques, for example, run length compression. The command data in the Subpicture format identifies the location and size of the subpicture, the location and size of highlight areas within the subpicture, and the location and size of one or more smaller areas within the subpicture that may have unique color and contrast values, etc.

In other applications, the superimposed video data associated with the main video may be in other formats. For example, an on-screen display format for a DVB/STB system presents the subvideo data in a format that generally includes only a header block and an uncompressed pixel data block. In addition, although invisible to the viewer, subvideo data can also be utilized during the vertical blanking interval ("VBI") between display fields or frames of a complete video image. In further applications, the subvideo data may also be provided in proprietary formats, such as a DSS format used with digital satellite transmissions; or the subvideo data may be in the form of raw pixel data that can be directly converted to analog signals for use by the display unit.

In the past, it was commercially feasible to market televisions that were designed to be compatible with only a single format, for example, the on-screen display format for superimposed video information. However, with the recent development and standardization of the digital Subpicture format defined by the DVD standard, there is a need for televisions to provide the capability of recognizing and processing different formats for superimposed video data.

SUMMARY OF THE INVENTION

The present invention provides an improved architecture for a digital video processor that processes subvideo data to be superimposed on a main video image during a display image scanning process. The improved digital video processor partitions the subvideo data processing between a CPU and a dedicated hardware processor under control of the CPU. The partitioned architecture first, permits the high speed processing of the pixel data in real time without unnecessarily burdening the CPU, thereby freeing it for other tasks and second, allows flexibility in system design to permit the processing of subvideo data being supplied in different data formats.

According to the principles of the present invention and in accordance with the preferred embodiments, the improved digital video processor includes a memory for storing the subvideo data. The processor further includes a CPU connected to the memory for processing a first portion of the subvideo data and a subvideo processor connected to the memory and responsive to the CPU for processing subvideo pixel data. Therefore, during a display image scanning process, color codes are provided by the subvideo processor. The above architecture divides and partitions of the execution of video command data between a programmable CPU and a dedicated hardware processor. The CPU is used to process the simpler and less time critical nonpixel related data, and dedicated subvideo processor operating under the control of the CPU processes the more complex, more time critical pixel data in real time. The divided or partitioned video 5 processing architecture has the advantage of providing the necessary speed in processing the pixel data while permitting the CPU to be available to perform other tasks.

In another embodiment of the invention, a method for processing subvideo data to be superimposed on a main video image during a display image scanning process, requires first, that first subvideo data be read. Next, the method requires the detection of the first subvideo data being in one of two known data formats; and thereafter, first pixel data is stored in the memory. Thereafter, the first pixel data is transferred to a subvideo processor which processes the first pixel data in accordance with the first video format to provide first color and contrast codes.

In accordance with another aspect of the invention, the CPU reads second subvideo data and detects that the second subvideo data is in a second of the two data formats. The CPU stores second pixel data in the memory and thereafter, transfers the second pixel data to the subvideo processor which processes the second pixel data in accordance with the second video format to provide second color and contrast codes. Thus, the improved video processor has a further advantage of being able to detect and process subvideo data that is presented in different data formats.

These and other objects and advantages of the present invention will become more readily apparent during the following detailed description taken in conjunction with the drawings herein.

BRIEF DESCRIPTION OF THE DRAWINGS

FIG. 1 is a schematic block diagram of only those portions of a television utilized in superimposing video in accordance with the principles of the present invention.

FIG. 2A is an illustration of a video display having subpicture subvideo superimposed thereon.

FIG. 2B is an illustration of a video display having highlight subvideo superimposed thereon.

DETAILED DESCRIPTION OF THE INVENTION

Figure 3:
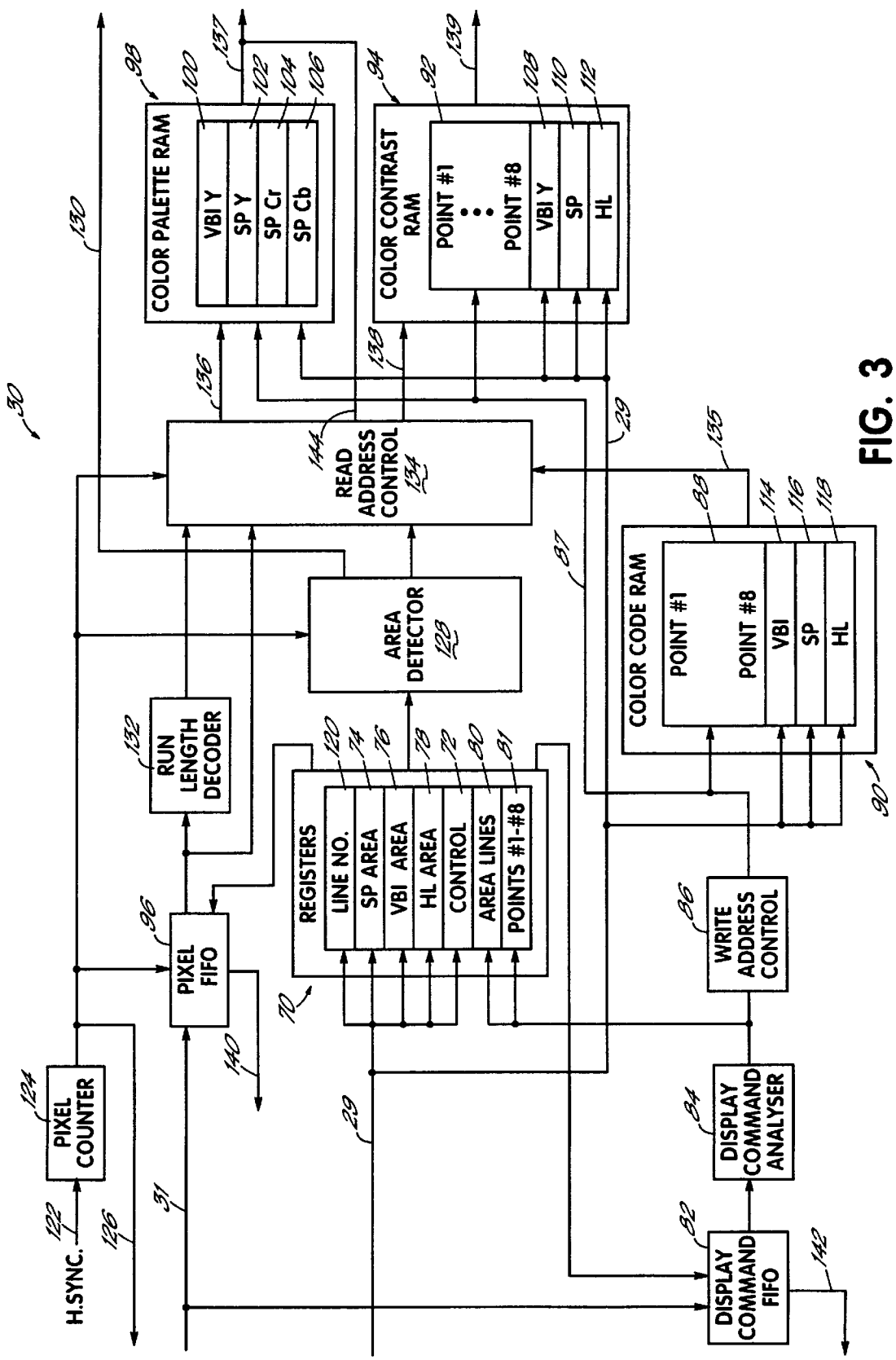
FIG. 3 is a schematic block diagram of a subvideo processor in accordance with the principles of the present invention.

Referring to FIG. 1, a television 18 contains a digital video processor 20 that receives on input 22 a continuous stream of data packets containing the audio and video information required to create the desired video images. The data packets include first data packets that preferably contain digital video information, in the MPEG-2 format., and, second data packets that contain audio information which is also in the MPEG-2 format. At different times, the data stream may include third data packets providing video information to be superimposed on the display screen. The superimposed video information may be provided by any one of several devices, for example, a VCR or DVD player, cable, a DSS, a menu display commanded within the television 18, etc.; and the video information may be supplied in any one of several different formats. The discussion to follow assumes the superimposed video data packet is constructed in accordance with the Subpicture format defined by the DVD standard and contains a header, pixel data and command data.

A decoder 23 within the video processor 20 uses known techniques to read and processes the main audio and video information contained in respective data packets, and the decoded data is stored in memory 24. The subpicture data packet containing the superimposed video information received on input 22 is decoded and read by video processor 20, and the pixel data is read into memory 24 in accordance with the instructions contained in the header portion of the data packet. In addition, the command data portion of the subpicture data packet is also stored in the memory 24 under the supervision of the header data. In creating the video image to be displayed, the CPU 26 provides a continuous stream of main video data from the memory 24 to a video blender 28. In addition, the CPU 26 provides subvideo command data over bus 29 to a subvideo processor 30 and further provides certain subvideo command data as well as subvideo pixel data from memory 24 over bus 31 to the subvideo processor 30. During the display image scanning process, the CPU causes the pixel data for the main video to be sequentially provided from the memory 24 to the video blender 28 via bus 32; and simultaneously therewith, the subvideo processor 30 provides, if appropriate, subpicture pixel data over bus 34 to the video blender 28. The video blender 28 utilizes a known process, for example, a mixing process, to mix the subvideo pixels on bus 34 with the main video pixels from memory 24 on bus 32 and produce the desired mixed or blended video data on output 36. The blended video data is then encoded in encoder 38 in accordance with a desired standard, for example, a NTSC or PAL standard; and thereafter, the encoded video data is converted to an analog signal in the digital to analog converter 40 and displayed on a display unit 42.

FIG. 2A illustrates an example of a display screen 50 for displaying main video images from a program source, and the display screen 50 includes an area of subvideo 52. The area of subvideo 52 may or may not have the same color and contrast as the background of the main display 50. The area of subvideo 52 includes the text "SUCH IS LIFE". A first area 54, within the subvideo 52, is defined around the text "SUCH IS LIFE". The first area 54 may have the same or a different color and contrast from the subvideo 52. Within the first area 54 is a second display area 56 surrounds the text "IS LIFE", which normally has a different color and contrast from the first area 54 and may function to highlight an area inside area 54. In the described embodiment, the color and contrast can be changed at eight different points in each vertical scan line of video.

Normally, the subpicture display areas 52, 54, 56 are produced from the same program or video source as the main video, for example, a DVD player; and further, under the DVD Subpicture format, those display areas are created in response to a Change Color-Contrast command within the command data portion of the subvideo format. In contrast, referring to FIG. 2B, a highlight area 60 is normally produced in response to an interactive command from a user and is not part of the preprogrammed material. For example, referring to FIG. 1, the highlight area 60 may be provided by a user pressing buttons on a remote unit 62 that is providing a signal on an input 44 of a menu generator 46. The menu generator 46 stores subvideo data in the memory 46 representing the menu display 62 with the highlight area 60 therein. The highlight area 60 normally has a color and contrast different from the background of the main video display 50.

The blender 28 of FIG. 1 may use one of several techniques for blending the main video and subvideo data. For example, the blender can mix the color and contrast in the main video display 50 with the color and contrast in the subvideo 52, such that subvideo 52 is superimposed over the main video 50; and the main video 50 is visible through the subvideo 52. In contrast, in processing the subpicture video data, the subvideo processor 30 does not mix color and contrast values; and instead the color and contrast values of pixels in the display areas 54, 56, and 58 and the highlight area 60 are used in place of the color and contrast values of corresponding pixels in the subvideo area 52. Similarly, the color and contrast values of pixels in the highlight area 60 are used in place of the color and contrast values of corresponding pixels in the subvideo area 52. However, whichever color and contrast values are ultimately chosen by the subvideo processor 30 are mixed with the color and contrast values of the main pixel data in the blender 28.

In the first example to be described herein, it will be assumed that the subvideo data is being presented in the DVD Subpicture format. The subvideo data packets are received on input 22 of video processor 20 (FIG. 1), interpreted by decoder 23 and loaded into the memory 24 under the control of CPU 26 in response to the header block of information. In the described embodiment, the subpicture 52 can change color and contrast at up to eight different points along any scan line within the subpicture area. A Change Color-Contrast ("CHG_COLCON") command within the command data controls the video within the subpicture area 52. The CPU 26, which operates in response to stored instructions, can efficiently process the field and scan line command data in the Subpicture format, that is, the simpler, less time critical command data. However, the pixel data is not efficiently processed by the CPU 26 in real time. The pixel data and associated command data can be more efficiently processed by separate hardware dedicated to that task, for example, the subvideo processor 30. The hardware devices in the subvideo processor 30 do not operate in response to stored instructions, that is, the hardware devices in the subvideo processor 30 are designed specifically to interpret the pixel data and associated command data transferred to the subvideo processor 30 by the CPU 26 and provide the color and contrast data to the blender 28 to produce the desired subpicture images. Hence, the interpretation of the command data in the Subpicture format is divided or partitioned between the CPU 26 and the dedicated subvideo processor 30 which functions under the control of the CPU. The subvideo processor 30 being a hardware processor is able to process the pixel data and related complex and large CHG_COLCON command data substantially faster than the CPU 26. In addition, the subvideo processor 30 is designed to provide selectable data paths so that other subvideo data formats may be processed, for example, the on-screen display format or, proprietary subvideo data formats.

To produce the video display 50, the video monitor 42 executes a known display image scanning process which requires a continuous stream of color and luminance, that is, contrast, data. If the display monitor is a known analog display device, the display image scanning process is a raster scanning process which assembles the displayed images of FIG. 2 by sequentially providing pixel data across successive horizontal scan or display lines. Thus, the location of each element of pixel data can be described in terms of a Cartesian coordinate system in which a horizontal x-axis is scaled in terms of increments defined by the positions of the pixel data in any one scan line, and a vertical y-axis is scaled in terms of horizontal rows defined by the scan line numbers. Therefore, start and end points 61 and 63, respectively, of the subpicture 52 can be described by x and y coordinates represented by scan line pixel locations and scan line numbers, respectively. The start and end points 61, 63 also define the area of subpicture 52. Similarly, the points along any known scan line at which the color and contrast change to provide the display areas 54 and 56 can be described in terms of a pixel number, or x coordinate.

Prior to the start of a raster scanning process, the CPU 26 sequentially reads the command data for successive scan lines that are stored in memory 24. For command data representing simpler, less complex command codes, the CPU transfers that command data over bus 29 to registers 70 illustrated in FIG. 3. For example, the CPU 26 passes field and scan line related command data to the control registers 72, for example, whether a subpicture block or VBI block is being processed, whether the NTSC or PAL mode is being used, whether the subvideo is in the Subpicture format, the on-screen display format, or a proprietary format, etc. In addition, the CPU 26 transfers over bus 29 and stores in registers 74 the vertical line numbers and horizontal pixel numbers defining the first point and the last point of the subpicture area 52. In a similar manner, the vertical line numbers and horizontal pixel numbers of the first and last points of the VBI and HL areas are loaded by the CPU 26 in registers 76, 78, respectively.

If, in its scan of command data, the CPU 26 encounters CHG_COLCON command data, that data is transferred from the memory 24 and over the bus 31 and stored in the display command first-in, first-out memory ("FIFO") 82. The FIFO 82 is a double size buffer so that two sets of CHG_COLCON command data may be stored therein. The CHG_COLCON command data is interpreted by a display command analyzer 84, and command data elements are stored at different locations within the subvideo processor 30. For example, the vertical scan line number within the subpicture area in which the next change of color and contrast is to occur is stored in the register 80. Further, the pixel numbers defining points within that scan line at which changes in color and contrast occur are stored in the registers 81. A write address control 86 transfers color code command data over bus 87 for storage in the appropriate location 88 of the color code RAM 90. In addition, the write address control 86 via bus 87 loads command data representing color and contrast maps in the appropriate locations 92 of the color contrast RAM 94.

As a further activity prior to initiating a raster scan process, the CPU 26 transfers pixel element data across the bus 31 for storage in the pixel FIFO 96. In addition, the CPU 26 provides other command data associated with the pixel data over bus 29 to the subvideo processor 30. Such command data includes a color code stored in color code RAM 90, color and contrast maps stored in the color contrast RAM 94, and a color palette code stored in the color palette RAM 98. For example, if the control data in register 72 indicates that the system is in the VBI mode, the CPU 26 will load a VBI color palette code in location 100 of color palette RAM 98. The palette code for the VBI mode is a gray scale code. Similarly, in the subpicture mode, the CPU via bus 29 writes into the color palette identifying data for the three primary colors of the subpicture area 52 in memory locations 102, 104, and 106 of the color palette RAM 98. As will be appreciated, the bus 29 is also connected to a host computer (not shown) within the television 18 (FIG. 1), and the host computer may also write color palette information into the color palette RAM 98. Further, depending on the mode, the CPU 26 stores color and contrast maps data in either the VBI, subpicture, or highlight locations 108, 110, 112 of the color contrast RAM 94. In addition, the CPU 26 stores a color code in either the VBI, subpicture or highlight locations 114, 116,118, respectively, of the color code RAM 90. Therefore, prior to the start of a raster scanning process, the subvideo processor 30 has data stored and available for processing.

As part of the command data processing, the CPU 26 initiates a raster scanning process. In doing so, the CPU 26 transfers command data relating to the first scan line number over bus 29 for storage in register 120. Next, pixel data associated with successive horizontal pixel numbers in that scan line are transferred from the memory 24, across bus 32 to video blender 28. The transfer of pixel data is normally initiated by a horizontal sync signal on bus 122 which increments a pixel counter 124 that in turn, provides clock signals on output 126 regulating the transfer of pixel data from the memory 24. Normally, the pixel counter has a number of unique states equal to the number of pixels in a scan line. An area detector 128 is also responsive to the state of the pixel counter 124 and determines whether the coordinates of the current pixel as represented by the state of the pixel counter 124 and the line number stored in register 120 are coincident with the line number coordinates stored in registers 74–80. If not, the subvideo processor is inactive; and the main video data being output on bus 32 from memory 24 is transferred through the video blender 28 without alteration.

The raster scanning process continues pixel by pixel and scan line by scan line until the area detector 128 determines that the state of the pixel counter 124 within a current line number identified in register 120 coincides with the pixel and line number of starting point 61 of subpicture area 52, which is stored in register 74 or a highlight area 60 stored in registers 78. Upon detecting that the current pixel represents a starting point of an area in which the color and contrast are to be changed, the area detector 128 provides a flag on the bus 130 to the video blender 28, indicating that the blending process is to be associated with this pixel.

If only the subpicture area 52 is detected, the subpicture video is processed through the subvideo processor 30 using the command data that was previously loaded therein by the CPU 26, as well as command data loaded by the CPU 26 contemporaneously with the current pixel count. The subpicture pixel information, which in the Subpicture format is compressed, is transferred from the pixel FIFO memory 96 through a run length decoder 132 and into the read address control 134. The read address control 134 interprets the pixel data and reads on input 135 a desired color code from the subpicture location 116 of color code RAM 90. That color code is then used by the read address control 134 to select via output 136 the appropriate colors from the color palettes stored in locations 102, 104, 106 of the color palette RAM 98. The appropriate color data is then provided over bus 137 from the color palette RAM 98 to the video blender 28. The read address control 134 via output 138 also causes the contrast data previously loaded into subpicture location 110 of the color contrast RAM 94 to be provided over bus 139 to the video blender 28.

The color and contrast data for the current pixel in the subpicture area 52 is mixed in the video blender 28 with the color and contrast data of the main picture, thereby superimposing the subpicture video thereon. The next horizontal sync signal on bus 122 will clock pixel counter 124 which initiates the processing of the next pixel data. In a similar manner as described above, the area detector detects that the next pixel is in the subpicture area, and the read address control provides the appropriate color and contrast data over busses 137 and 139, respectively, to the video blender. The process continues for each pixel number in the current scan line. When enough pixel data is processed to cause the pixel FIFO 96 to become only half full, an interrupt is provided over line 140 to the CPU 26; and the CPU 26 transfers more pixel data over bus 31 for storage in the pixel FIFO 96.

In processing the current pixel number, the area detector 128 may determine that the current scan line number is located in one of the other areas 54, 56 and thus, corresponds to a scan line number stored in registers 80. The area detector 128 may also determine that the current pixel is a starting point for one of the other areas 54, 56 and thus, corresponds to one of the pixels stored in registers 76, 81.

For example, the area detector 128 may determine that the current pixel corresponds to a starting point of area 54 which is identified and stored as point #1. In that situation, the CPU normally stores new command data in the subpicture locations 102, 104, 106 of the color palette RAM 98. The read address control 134, instead of using the subpicture color code in location 116, uses the decoded pixel data from decoder 132 to read color code of point #1 from location 88 of RAM 90. The color code in location 88 of RAM 90 was previously stored by the display command analyzer processing CHG_COLCON command data associated with the subpicture area 52. The read address control 134 then selects the appropriate colors from the newly stored color palettes in locations 102, 104, 106 of the color palette RAM 98 which are, in turn, output on the bus 137. In addition, the write control 86 had previously stored color and contrast maps in location 92 of the color contrast RAM 94; and instead of using the subpicture data in location 110, the read address control 134 provides the color and contrast map data for point #1 from location 92 of color contrast RAM 94 to be output on bus 139.

Thereafter, with each successive pixel within the scan line, the color and contrast codes associated with point #1 are used until the area detector 128 detects that the currently active pixel corresponds to the start of display area 56 which as been designated point #2 in registers 81. The read address control 134 uses the pixel data from the decoder 132 to read the desired color code of point #2 for area 56 from location 88 and interprets that color code to select the desired colors from the palettes in locations 102, 104, 106 of color palette RAM 98. Similarly, the read address control 134 also selects the desired color and contrast maps for point #2 from location 92 of the color contrast RAM 94. Those color and contrast codes are used until the active pixel corresponds to the end of display area 56 defined by a point #3 which returns the color and contrast codes to those associated with display area 54. Those codes remain active until the current pixel corresponds to the end of display area 54 defined by a point #4 which has color and contrast codes associated with the subpicture area 52. Those codes remain active until the end of subpicture area 52. At that time, the subvideo processor ceases to provide data on its outputs 130, 137, 139, and the color and contrast codes for the main picture display area 50 are used without any blending. The main picture color and contrast codes are used until the end of the currently active raster scan line. The process is repeated for each successive raster scan line in the display.

After processing one CHG_COLCON command for one field of the main display 50, the next CHG_COLCON command is read from the display command FIFO 82 and into display command analyzer 84. The analyzer 84 interprets the new CHG_COLCON command data and stores new subpicture video data in registers 74, 80, 81 for the next display field in which the subpicture video is active. In addition, the write address control also stores new color codes in location 88 of color code RAM 90 as well as new color and contrast map data in location 92 of the color contrast RAM 94. Further, the processing of the new CHG_COLCON command data empties one of the two CHG_COLCON command data storage locations in the display command FIFO 82, and an interrupt is provided on interrupt line 142 to the CPU 26. The CPU 26 then transfers the next set of CHG_COLCON command data from memory 24 and across bus 31 for storage in display command FIFO 82.

The CPU 26 continuously scans the command data stored in the memory 24; and upon a highlight area being detected in a display field (FIG. 2B), the CPU stores new color code data in location 118 of color code RAM 90, new color palette data in locations 102, 104, 106 of color palette RAM 98 and new color and contrast map data in location 112 of color contrast RAM 94. If the area detector 128 determines that the currently active pixel is located within the highlight area 60, the read address control 134 utilizes the current pixel data to read the desired color code from the highlight location 118 of color code RAM 90 and uses that highlight color code to select the appropriate colors from locations 102, 104, 106 of the color palette in RAM 98. The read address control 134 also reads the highlight color and contrast maps from location 112 of the color contrast RAM 94.

Thus, various displays and images as shown in areas 52, 54, 56 of FIG. 2A or a highlight area 60 of FIG. 2B may be superimposed over the main picture display 50 by providing and processing data in the Subpicture format in accordance with the DVD standard. Further, in processing the subpicture information in accordance with that standard, the command data associated with different displays is processed by two different devices. First, simpler less time critical, field and scan line command data is interpreted and processed by programmed instructions in the CPU 26 and transferred over the bus 29 to registers 70. However, the more complex subvideo pixel data associated with the CHG_COLCON command data is detected by the CPU 26 and transferred from the memory 24 to FIFO 82 to be processed by nonprogrammable hardware, that is, the change display command analyzer 84, write address control 86, and color code RAM 90. Those hardware elements are not operated by programmed instructions and are specifically designed to process only the CHG_COLCON command data at speeds significantly greater than if the data were being processed by the CPU 26.

Figure 4:
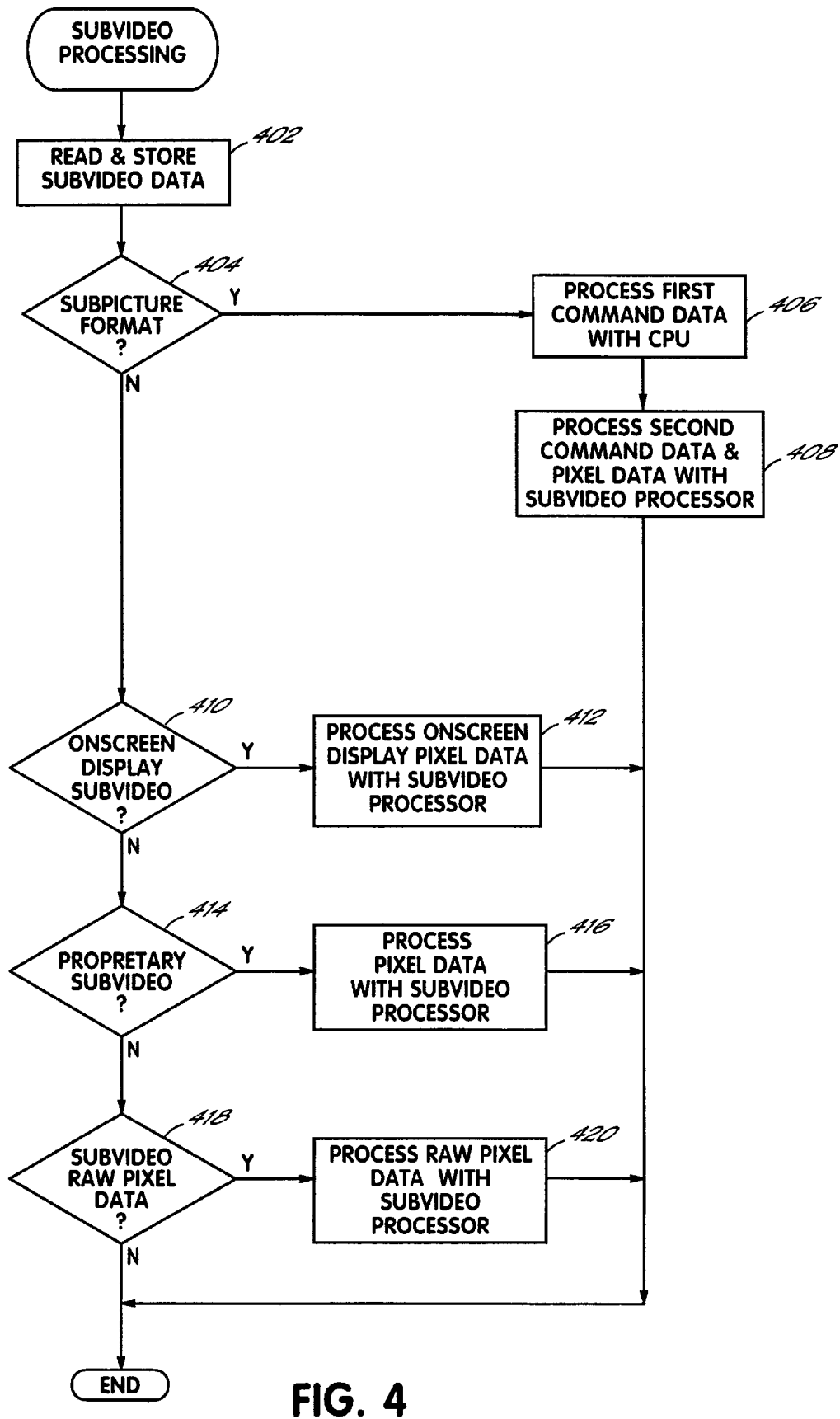
FIG. 4 is a flow chart of the general process executed by the CPU in processing subvideo data in accordance with the principles of the present invention.
Figure 5:
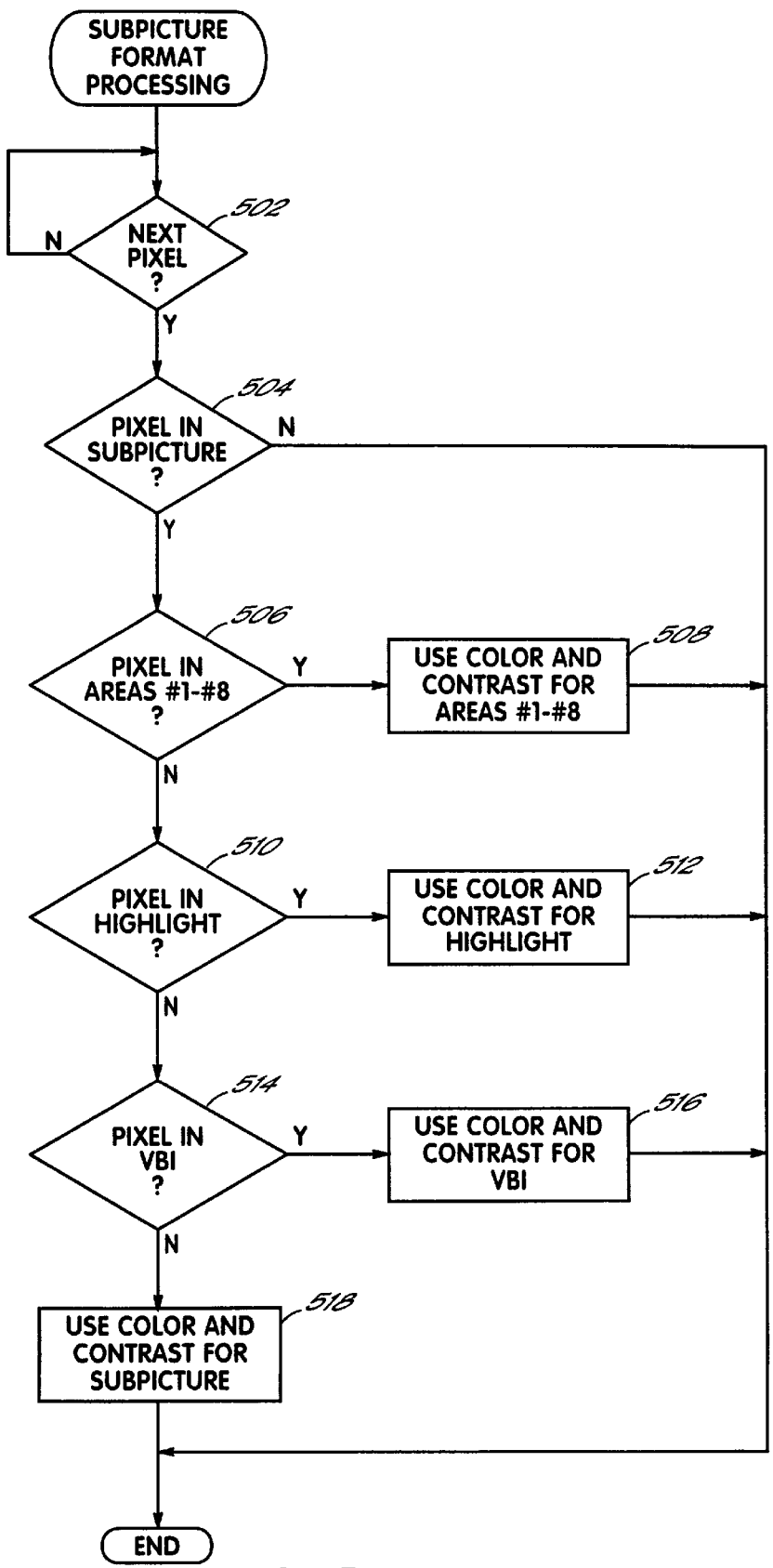
FIG. 5 is a flow chart of the general process executed by the subvideo processor in processing subvideo data in the Subpicture format in accordance with the principles of the present invention.

The processing of subvideo data in the Subpicture format is summarized in the flow charts of FIGS. 4 and 5. Referring to FIGS. 1 and 4, at 402, the CPU 26 reads the subvideo data received on input 22; and that data is stored in memory 24. Upon the CPU 26 determining at 404 that the subvideo data is in the Subpicture format, at 406, first command data comprised of simpler, less complex command codes are processed by the CPU 26; and at 408, the CPU 26 transfers second command data comprised of more complex command codes, for example, the CHG_COLCON command code, and pixel data to the subvideo processor 30.

Referring to FIGS. 3 and 5, the subvideo processor 30, via the pixel counter 124, detects at 502 the activation of each successive pixel. The area detector 128 then at 504 tests whether the active pixel is in the Subpicture area. If it is, the area detector 128 then determines at 506 whether the active pixel is in one of the areas #1–#8. If so, the read address control 134 selects the color code from the appropriate area 88 of the color code RAM 90 which is used to select the proper color from the color palette RAM 98. In addition, the read address control 134 selects the appropriate contrast code from the area 92 of the color contrast area 94.

If the active pixel is not in one of the areas #1–#8, the area detector 128 tests at 510 whether the active pixel is in a highlight area. If it is, the read address control 134 then at 512 selects the appropriate color code and palette from the color code RAM 90 and color palette RAM 98, respectively; and the contrast code in highlight area 112 of color contrast RAM 94 is also selected. If the active pixel is not in a highlight area, the area detector 128 tests at 514 whether the active pixel is in the vertical blanking inset area. If so, the read address control 134 selects at 516 the appropriate color code, palette and contrast values from the RAMs 90, 98 and 94 in the manner previously described. If the active pixel is in the subpicture area, but not in any of the other areas, the read address control 134 selects at 518 the appropriate color code, palette and contrast values from the RAMs 90, 98 and 94 in the manner previously described.

The subvideo processor 30 has the capability of processing on-screen display subvideo data in which the pixel data is not compressed. Referring to FIGS. 1, and 4, if at 410, the CPU 26 detects on-screen display subvideo data, the CPU 26 then at 412 transfers on screen display pixel data to the subvideo processor 30 for processing. With on screen display subvideo data, the run length decoder 132 (FIG. 3) is disabled, and the read address control 134 reads the uncompressed pixel data directly from the FIFO 96. The read address control 134 then reads the desired color code from color code RAM 90 and selects the desired colors from the color palette RAM 98.

The CPU 26 may also detect at 414 that the subvideo data is in a proprietary format. Once again, at 416, the CPU 26 transfers the proprietary format pixel data to the subvideo processor 30 for processing. In addition, the CPU 26 may detect at 418 that the subvideo data is in the form of raw pixel data. Once again, the CPU 26 at 420 transfers the raw pixel data to the subvideo processor 30 which normally passes the raw pixel data to the blender 28. In that process, the CPU 26 causes the read address control 134 (FIG. 3) to provide the raw pixel data on an output 144, which is connected to the color bus 137, thereby providing the raw pixel data to the blender 28. During the processing of the subvideo data by the CPU 26, once a state or condition within the subvideo processor 30 is established, that state or condition is not refreshed, but is maintained until a different state or condition is created. The subvideo processor 30, therefore, has the versatility and capability of processing subvideo data in different formats. Further, the flexibility of providing different data paths within the processor 30 allow it to be adapted to be able to process other subvideo data formats that may arise in the future.

While the invention has been illustrated by the description of several embodiments and while the embodiments have been described in considerable detail there is no intention to restrict nor in any way limit the scope of the amended claims to such detail. Additional advantages and modifications will readily appear to those who are skilled in the art. Therefore, the invention in its broadest aspects is not limited to the specific details shown and described. Consequently, departures may be made from the details described herein without departing from the spirit and scope of the claims which follow.

What is claimed is:

1. A digital video processor for processing subvideo data to be superimposed on a main video image during a display image scanning process, the subvideo data being provided in two different data formats, the video processor comprising:

a memory for storing first subvideo data in a first data format and second subvideo data in a second data format;

a CPU connected to the memory for processing first portions of the first and second subvideo data and detecting the first video data being in a first video format and the second video data being in the second data format; and a subvideo processor connected to the memory and responsive to the CPU for processing pixel data associated with the first and second subvideo data in the respective first and second data formats, whereby during the display image scanning process, color codes are provided from the subvideo processor.

2. A digital video processor for processing subvideo data to be superimposed on a main video image during a display image scanning process, the subvideo data including pixel data and command data, the video processor comprising:

a memory for storing the pixel data and the command data;

a CPU connected to the memory for processing a first portion of the command data; and a subvideo processor connected to the memory and responsive to the CPU for processing a second portion of the command data and the pixel data, whereby during a display image scanning process, color and contrast codes are selectively commanded by the CPU and the subvideo processor as a function of the command data being processed by the CPU and the subvideo processor.

3. The digital video processor of claim 2 wherein the subvideo processor comprises:

a first memory for storing pixel data;

a second memory for storing command data defining a first area of subvideo to be superimposed on the main video;

a detector for detecting the occurrence of an active pixel in the main video within the first area of subvideo; and a subvideo color control responsive the detector for providing color codes from the subvideo processor associated with pixel data in the first memory to be used in conjunction with the active pixel in the main video.

4. The digital video processor of claim 3 wherein the detector detects the occurrence of an active pixel in the main video in a second area of subvideo within the first area of subvideo, and subvideo processor further comprises a command data control for processing command data associated with the second area of subvideo and providing color data to the subvideo color control, the subvideo color control providing color codes from the subvideo processor associated with pixel data in the second area of subvideo to be used in conjunction with the active pixel in the main video.

5. The digital video processor of claim 2 wherein the CPU includes devices operating in response to stored programmed instructions and the subvideo processor includes devices operating not using stored programmed instructions.

6. A method for processing subvideo data to be superimposed on a main video image during a display image scanning process, the method comprising:

reading first and second subvideo data with the CPU;

processing first portions of the first and second subvideo data with the CPU;

detecting the first subvideo data being in a first data format and the second subvideo data being in a second data format;

storing first and second pixel data associated with the first and second subvideo data in a memory;

transferring the first and second pixel data to a subvideo processor in response to the CPU; and processing the first and second pixel data with the subvideo processor in accordance with the respective first and second video formats to provide first color codes for the first and second subvideo data, respectively.

7. A method for processing subvideo data to be superimposed on a main video image during a display image scanning process, the method comprising:

reading first subvideo data with the CPU;

detecting the first subvideo data being in a first of two subvideo data formats;

storing first pixel data associated with the first subvideo data in a memory;

transferring the first pixel data to the subvideo processor; and processing the first pixel data with the subvideo processor in accordance with the first video format to provide first color and contrast data.

8. The method of claim 7 further comprising the steps of:

reading second subvideo data with the CPU;

detecting the second subvideo data being in a second of the two data formats;

storing second pixel data associated with the second subvideo data in the memory;

transferring the second pixel data to the subvideo processor in response to the CPU processing the first portion of the second data format; and processing the second pixel data with the subvideo processor in accordance with the second video format to provide second color and contrast data.

9. A method for processing subvideo data to be superimposed on a main video image during a display image scanning process, the subvideo data being provided in a format including at least pixel data and command data, the method comprising:

storing the pixel data and the command data in a memory, the command data defining a first area of a subvideo image to be superimposed on the main video image;

processing a first portion of the command data in a CPU;

processing, in response to the CPU processing the first portion of the command data, pixel data and a second portion of the command data in a subvideo processor to provide during the scanning process, color and contrast data represented by the pixel data.

10. The method of claim 9 further comprising the steps of:

selecting during the scanning process an active pixel in the main video;

identifying the active pixel being in the first area of the subvideo image; and providing color information associated a pixel in the first area of subvideo to be used in conjunction with the active pixel in the main video.

11. The method of claim 10 further comprising the steps of:

identifying the active pixel being in a second area inside the first area of the subvideo image; and providing color information associated a pixel in the second area of the subvideo to be used in conjunction with the active pixel in the main video.

12. The method of claim 11 further comprising the steps of:

identifying the active pixel being in a highlight area inside the first area of the subvideo image; and providing color information associated a pixel in the highlight area of the subvideo to be used in conjunction with the active pixel in the main video.

13. The method of claim 12 herein the pixel data is compressed and the method further comprises the step of providing uncompressed pixel data in response to the compressed pixel data.

14. The method of claim 13 further comprises the steps of:

processing the first portion of the command data directly and in response to stored instructions; and processing the second portion of the command data without using stored instructions.

* * * * *